United States Patent Office 2,759,964
Patented Aug. 21, 1956

2,759,964
DIALKYLAMINOALKYL ESTERS OF PHENYL SUBSTITUTED DIHYDROXYBENZOIC ACIDS

Floyd L. Beman, Midland, Mich., assignor to The Dow Chemical Company, Midland, Mich., a corporation of Delaware No Drawing. Application July 9, 1953,
Serial No. 367,103

7 Claims. (Cl. 260—473)

This invention is concerned with basic dialkylaminoalkyl esters of the phenyl substituted dihydroxybenzoic acids and the acid addition salts thereof.

The basic esters of the invention are characterized by the formula

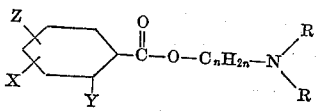

In this and succeeding formulae, $n$ represents an integer from 2 to 4 inclusive, each R represents a lower alkyl radical containing from 1 to 4 carbon atoms, inclusive, X represents a phenyl radical, Y represents hydroxyl and Z represents hydroxyl which is meta to the carboxy group and is para to Y when X is meta to Y. These ester compounds are crystalline materials which are somewhat soluble in many organic solvents and of low solubility in water. The acid addition salts of these ester compounds are crystalline solid materials readily soluble in many of the common organic solvents and water. The esters and acid addition salts of the invention are valuable as intermediates for the preparation of more complex organic derivatives and as active toxic constituents of parasiticidal compositions. Representative members of the new compounds have been found of particular value as active toxic constituents of disinfectant and germicidal compositions for the control of Salmonella typhosa and Staphylococcus aureus.

The new ester compounds may be prepared by reacting a phenyl substituted dihydroxybenzoic acid of the formula

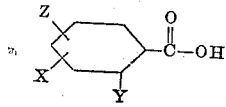

with a dialkylamino haloalkane of the formula

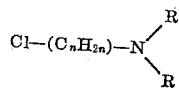

The reaction is usually conducted in the presence of an organic solvent such as isopropanol and takes place smoothly at temperatures in excess of about 60° C. In a convenient mode of operation, the reaction may be carried out at the boiling temperature of the reaction mixture and under reflux. The amounts of the reactants to be employed are not critical, some of the desired product being produced with any proportion of ingredients. In general, optimum yields are obtained when employing substantially equimolecular proportions of the reactants. Upon completion of the reaction, the reaction mixture may be filtered while hot and the filtrate cooled to room temperature or lower. During the cooling a dialkylaminoalkyl phenyl-dihydroxybenzoic acid hydrochloride precipitates as a crystalline solid. The latter may be purified by recrystallization from various organic solvents.

The free esters can be recovered by treating an aqueous solution of the hydrochloride with an alkali metal hydroxide or other suitable alkaline reacting reagent. In such operations, substantially equimolecular proportions of the hydrochloride and alkali are employed. The ester, which is substantially insoluble in water, may thereafter be separated from the reaction mixture, washed with water and dried. If desired, the product may be further purified by recrystallization from suitable organic solvents.

Acid addition salts of the esters such as the hydrochloride, hydrobromide, phosphate, benzoate, sulfate, acetate, succinate, and other addition salts may be prepared by allowing the free ester to react with the desired acid in a solvent such as ethanol or isopropanol. Upon recovery of the solvent by distillation or evaporation, the salt is obtained as a crystalline residue. The latter may be purified by recrystallization from alcohol or other suitable solvents.

"Lower alkyl" as used in this specification and appended claims is intended to include all aliphatic groups having from 1 to 4 carbon atoms, inclusive, e. g. methyl; ethyl; propyl; isopropyl; butyl; secondarybutyl; and tertiarybutyl. The carbon chain of the alkylene group, —$C_nH_{2n}$— can be either straight or branched in configuration. Representative groups include ethylene; propylene; trimethylene; butylene; 1-methyl-trimethylene; 2-methyl-trimethylene; and tetramethylene. Representative basic alkyl esters, which among others, are within the scope of the invention, include β-diisopropylaminosecondarybutyl 3-phenyl-2,5-dihydroxybenzoate; β-methyl-ethylaminoethyl 4-phenyl-2,5-dihydroxybenzoate; β-butyl-methylaminopropyl 5-phenyl-2,3-dihydroxybenzoate; γ-dibutylaminobutyl 3-phenyl-2,5-dihydroxybenzoate and β-diethylaminoethyl 6-phenyl-2,5-dihydroxybenzoate.

The following examples are given to illustrate one manner which may be used to prepare the compounds of the present invention, but are not to be construed as limiting.

*Example 1.—β-Diethylaminoethyl 4-phenyl-2,5-dihydroxybenzoate hydrochloride*

36.8 grams (0.16 mole) of 4-phenyl-2,5-dihydroxybenzoic acid was dissolved in 100 milliliters of isopropanol and 100 milliliters of a benzene solution containing 22 grams (0.16 mole) of diethylamino-2-chloroethane mixed therewith. The resulting mixture was thereafter heated for about 4 hours at the boiling temperature and under reflux. The solvent was then removed by evaporation to obtain a β-diethylaminoethyl 4-phenyl-2,5-dihydroxybenzoate hydrochloride product as a crystalline residue. The latter material was twice recrystallized from isopropanol and found to melt at 173.5°–174.5° C.

*Example 2.—β-Dimethylaminoisopropyl 6-phenyl-2,5-dihydroxybenzoate hydrochloride*

0.4 mole quantities of 6-phenyl-2,5-dihydroxybenzoic acid and dimethylamino-2-chloropropane and 300 milliliters of isopropanol are mixed together and thereafter heated for 6 hours at the boiling temperature of the mixture and under reflux. The solvent alcohol is then removed by evaporation to obtain a β-dimethylaminoisopropyl 6-phenyl-2,5-dihydroxybenzoate hydrochloride product as a crystalline residue.

*Example 3.—β-Diethylaminoethyl 3-phenyl-2,5-dihydroxybenzoate hydrochloride*

36.8 grams (0.16 mole) of 3-phenyl-2,5-dihydroxybenzoic acid was dissolved in 100 milliliters of isopropanol and 100 milliliters of a benzene solution containing 22 grams (0.16 mole) of diethylamino-2-chloroethane admixed therewith. The resulting mixture was thereafter heated for about 5 hours at the boiling temperature and under reflux. Following the heating period, the solvent was separated from the reaction mixture by evaporation to obtain a β-diethylaminoethyl 3-phenyl-2,5-dihydroxybenzoate hydrochloride product as a crystalline residue. The latter was recrystallized from isopropanol and found to have a melting point of 187.5°–189° C.

*Example 4.—β-Diisopropylaminoethyl 3-phenyl-2,5-dihydroxybenzoate hydrochloride*

0.2 mole quantities of 3-phenyl-2,5-dihydroxybenzoic acid and diisopropylamino-2-chloroethane and 225 milliliters of isopropanol are mixed together and thereafter heated for about 5 hours at the boiling temperature of the mixture and under reflux. The alcohol solvent is then removed by evaporation to obtain a β-diisopropylaminoethyl 3-phenyl-2,5-dihydroxybenzoate hydrochloride as a crystalline residue.

*Example 5.—β-Diethylaminoethyl 5-phenyl-2,3-dihydroxybenzoate hydrochloride*

23 grams (0.1 mole) of 5-phenyl-2,3-dihydroxybenzoic acid, 62.5 milliliters of a benzene solution of diethylamino-2-chloroethane (equivalent to 0.1 mole of diethylamino-2-chloroethane) and 100 milliliters of isopropanol were mixed together and heated for 8.5 hours at the boiling temperature of the reaction mixture and under reflux. Following the heating period, the solvent was separated from the reaction mixture by evaporation to obtain a β-diethylaminoethyl 5-phenyl-2,3-dihydroxybenzoic acid hydrochloride product as a crystalline solid. The latter was twice recrystallized from isopropanol and found to melt at 188.5°–189.5° C.

*Example 6.—β-Diethylaminoethyl 4-phenyl-2,5-dihydroxybenzoate*

Five milliliters of normal aqueous sodium hydroxide was added portionwise to 2 grams of β-diethylamino-ethyl 4-phenyl-2,5-dihydroxybenzoate hydrochloride dissolved in 100 milliliters of water. Following the addition, a β-diethylaminoethyl 4-phenyl-2,5-dihydroxybenzoate product crystallized in the mixture and was extracted therefrom with benzene. The benzene was then removed by evaporation and the residue dried and found to melt at 98°–101° C.

*Example 7.—β-Diethylaminoethyl 4-phenyl-2,5-dihydroxybenzoate sulfate*

1.6 milliliters of normal sulfuric acid was added portionwise to 0.5 gram of β-diethylaminoethyl 4-phenyl-2,5-dihydroxybenzoate dissolved in a mixture of 100 milliliters of methanol and 50 milliliters of isopropanol. The solvent was then removed by evaporation to obtain a β-diethylaminoethyl 4-phenyl-2,5-dihydroxybenzoate sulfate product as a crystalline residue. The latter had a melting point of 113°–114° C.

The phenyl substituted dihydroxybenzoic acids, employed as starting materials as previously described, may be prepared by hydrolyzing a suitable halogenated phenyl 2-hydroxybenzoic acid. The hydrolysis is carried out in an aqueous alkaline medium and preferably in an aqueous solution of an alkali metal hydroxide. The reaction takes place smoothly at temperatures of from 50° to 180° C. Upon completion of the hydrolysis, the reaction mixture is acidified with a mineral acid, the desired phenyl substituted dihydroxybenzoic acid product precipitating as a crystalline solid. The latter compounds and methods for their production constitute the subject matter of my copending application, Serial No. 367,102, filed concurrently herewith.

The halogenated phenyl-2-hydroxybenzoic acids as described above may be prepared by halogenating a suitable phenyl substituted 2-hydroxybenzoic acid in glacial acetic acid as reaction medium. The halogenation takes place smoothly at temperatures of from about 40° to 115° C. In carrying out the reaction, bromine, chlorine, or iodine chloride is contacted portionwise with the phenyl 2-hydroxybenzoic acid dissolved in acetic acid and under conditions of elevated temperature in the reaction vessel. Upon completion of the reaction, the mixture may be diluted with water to precipitate the halogenated phenyl 2-hydroxybenzoic acid product as a crystalline solid. These compounds and methods for their production are disclosed in a copending application, Serial No. 327,455, filed December 22, 1952.

I claim:

1. A compound selected from the group consisting of (a) esters having the formula

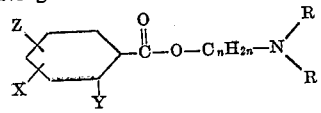

wherein n represents an integer from 2 to 4, inclusive, each R represents a lower alkyl radical containing from 1 to 4 carbon atoms, inclusive, X represents a phenyl radical, Y represents hydroxyl and Z represents hydroxyl which is meta to the carboxy group and is para to Y when X is meta to Y, and (b) the acid addition salts thereof.

2. Acid addition salts of esters having the formula

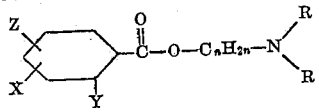

wherein n represents an integer from 2 to 4, inclusive, each R represents a lower alkyl radical containing from 1 to 4 carbon atoms, inclusive, X represents a phenyl radical, Y represents hydroxyl and Z represents hydroxyl which is meta to the carboxy group and is para to Y when X is meta to Y.

3. β-Diethylaminoethyl 3-phenyl-2,5-dihydroxybenzoate hydrochloride.

4. β-Diethylaminoethyl 4-phenyl-2,5-dihydroxybenzoate hydrochloride.

5. β-Diethylaminoethyl 5-phenyl-2,3-dihydroxybenzoate hydrochloride.

6. β-Diethylaminoethyl 4-phenyl-2,5-dihydroxybenzoate.

7. β-Diethylaminoethyl 4-phenyl-2,5-dihydroxybenzoate sulfate.

References Cited in the file of this patent

UNITED STATES PATENTS

| | | |
|---|---|---|
| 1,976,922 | Christiansen et al. | Oct. 16, 1934 |
| 2,594,350 | Sahyun | Apr. 29, 1952 |